United States Patent Office 2,942,981
Patented June 28, 1960

2,942,981

PROCESS FOR PRODUCING SMOKED CEREAL FOOD

John W. Donahey, P.O. Box 493, Hudson, Ohio

No Drawing. Filed Dec. 14, 1953, Ser. No. 398,205

1 Claim. (Cl. 99—80)

This invention relates to food products and more particularly to food products of the type intended for blending with meat to render a palatable food which has both the advantages of meat and of cereal and which at once has the characteristic flavor of meat, particularly smoked meat such as sausage, so that the consumer who prefers meat to cereals and others who have little preference in the matter can eat a single food that will give them the balanced and wholesome diet characteristic of a meat and a cereal product.

The material to which this invention relates is in its contemplated form made from dry, whole field or flint corn processed as will be explained as this specification continues.

Briefly it can be said that the corn is treated so as to render it palatable and tender and the corn is smoked, the end product being one which can be mixed with ground meat and most particularly with fats in such a manner that the two foods blend into a highly nutritious and palatable mixture of meat and cereal.

The practice of this invention will be described with regards to a batch of cereal food. For example, I have found excellent results to be obtained by taking one hundred (100) pounds of dry, whole field flint corn, either yellow or white, and adding to the corn three hundred (300) pounds of water and one and one-half (1½) pounds of sal soda. This mixture of water, corn and sal soda is placed in a steam kettle and cooked until the corn has become tender and swelled but not cooked long enough until all the starch is withdrawn from the corn into the liquid. The sal soda causes the hulls of the kernels of the corn to soften and hastens the swelling of each kernel during the cooking process and in addition improves the flavor of the corn so that it resembles hominy in taste at this point in the process.

When the corn has been cooked long enough to become tender, which can be determined by an examination of the batch from time to time, it is removed from the steam kettle and placed on screen trays or the like to drain after which it is given a thorough rinsing or washing by means of three or four cold water baths which washing dissolves and removes all the sal soda and the majority of the hulls of the kernels. Since this washing takes place after the cooking water which contains in solution the majority of the sal soda has been drained from the kernels of the corn, the washing completes the elimination of the sal soda from the corn and leaves a moist, tender group of kernels somewhat expanded and most of them without their hulls.

The hulled and washed corn is now placed in a freezer and brought down to a temperature of −10° F. This disrupts and breaks down the cellular structure of the corn as well as expelling most of the moisture to the exterior of the corn where it gathers in the form of frost. The corn is next removed from the freezer and brought up to room temperature whereupon the frost melts and drains off thru the screen trays.

The slightly moist corn is next smoked in a smokehouse. The moist corn is placed upon wire trays, spread around about two (2) inches deep and subjected to a forced hickory smoke for four (4) hours, the smoke being forced through the trays of the corn by means of a blower, the temperature of the smoke being in the neighborhood of one hundred and eighty (180) degrees Fahrenheit and the smoking process is continued until the corn mass is dry. The dried, smoked corn is next pulverized or ground in a hammer mill; seasonings such as salt, pepper, sage and curry are added; and the smoked, seasoned meal is bagged.

The smoked meal is hygroscopic and will take on as much as two to four times its own weight in water. In use I mix the meal with meat such as ground pork and with water. A typical recipe will be 1 part of meal, 4 parts of water and 5 parts of ground meat—all by volume. The procedure is to bring the water to a boil, add the smoked meal which will take up most of the water, and let cool to room temperature. The moist meal may now be mixed with the ground meat. This mixture is fried or otherwise prepared for eating just as is pork sausage and when cooked has the taste of smoked sausage without having the very high fat content of the latter.

I have found that during the development of this invention that unless the mixture of corn and water is frozen as described, when the final product is mixed with meat and fried the corn part of the mixture tends to pop thereby disrupting the patty or cake being cooked. I have also found that by subjecting the watered corn to temperatures below the freezing point the finished meal has a high degree of consistency and strength which makes it easy to mix it with water and ground meat such as pork to produce a patty of meat and cereal that can be readily manipulated and handled by the cook who is preparing the food.

To summarize my findings briefly I might state that the sal soda, even though it is eventually completely removed by rinsing or washing operations from the corn, changes the taste of the corn in a beneficial manner which coupled with the smoking operation results in a product having a distinctive flavor. Of course, the seasoning is dependent upon the taste of the consumer and on the nature of the meat with which the meal is to be mixed. It also appears that the process described renders the meal suitable for absorbing fat so that the meal and the meat become in effect one food. I have also found that mixing the prepared meal as outlined in the above specification with ordinary so-called beef meat loaf converts the mixture into a loaf having much the taste characteristics of smoked ham. It is an additional feature of my product that it is compatible with meats having more fat than are considered to be acceptable by some people in that the meal being smoked and treated will accept the fat and convert it along with the cereal itself into a highly palatable food.

The smoking process referred to has been carried out with the smoke from hickory logs as is usual in such processes, but it is to be understood that the terms "smoked" and "smoking" refer to equivalent curing and drying processes that impart the characteristic smoked flavor to the product while preserving it.

Having completed the detailed description of my invention so that others skilled in the art may practice same I claim:

The process of preparing an edible material for human consumption comprising cooking kernels of cereal grain in water with a small percentage of an alkali in the water until the kernels are softened and swelled and the hulls loosened, removing most of the alkali by a rinsing operation, freezing the water in the softened kernels of grain to disrupt the cellular structure of the grain, thawing the frozen grain, smoking the swelled grain while moist until dry, and grinding the dried and smoked grain into a meal.

References Cited in the file of this patent

UNITED STATES PATENTS

| | | |
|---|---|---|
| 318,768 | Lorch | May 26, 1885 |
| 332,073 | Gillman et al. | Dec. 8, 1885 |
| 580,401 | Hopkins | Apr. 13, 1897 |
| 880,359 | Collins | Feb. 25, 1908 |
| 1,281,828 | Pierson | Oct. 15, 1918 |
| 2,021,721 | Gibbon | Nov. 19, 1935 |
| 2,338,156 | Allen | Jan. 4, 1944 |
| 2,507,486 | Weissenbach | May 9, 1950 |
| 2,530,272 | Thrasher | Nov. 14, 1950 |

FOREIGN PATENTS

| | | |
|---|---|---|
| 3,032 | Great Britain | 1862 |